United States Patent
Blanchet et al.

(10) Patent No.: US 6,858,243 B2
(45) Date of Patent: Feb. 22, 2005

(54) PIZZA PREPARATION AND DELIVERY METHOD AND UNIT

(75) Inventors: Jean Blanchet, Le Cateau (FR); Hervé Cathelin, Paris (FR); Christian Hebert, Bornel (FR); Olivier Nouyrit, Levallois (FR)

(73) Assignee: Nestec S.A., Vevey (CH)

( * ) Notice: Subject to any disclaimer, the term of this patent is extended or adjusted under 35 U.S.C. 154(b) by 268 days.

(21) Appl. No.: 09/982,377

(22) Filed: Oct. 18, 2001

(65) Prior Publication Data

US 2002/0048624 A1 Apr. 25, 2002

(30) Foreign Application Priority Data

Oct. 18, 2000 (EP) .......................................... 00122736

(51) Int. Cl.[7] ................................................ A23L 1/00
(52) U.S. Cl. ........................ 426/523; 426/95; 426/496; 426/524
(58) Field of Search ................................ 426/496, 523, 426/524, 391, 446, 95; 99/357; 296/24.1

(56) References Cited

U.S. PATENT DOCUMENTS

| | | | | |
|---|---|---|---|---|
| 3,879,564 A | * | 4/1975 | Cocozzella | 426/95 |
| 4,164,591 A | * | 8/1979 | Ahlgren et al. | 426/523 |
| 4,361,227 A | | 11/1982 | Paulucci | 206/45.32 |
| 4,791,861 A | | 12/1988 | Weinkle et al. | 99/357 |
| 4,919,477 A | * | 4/1990 | Bingham et al. | 426/523 |
| 5,256,432 A | * | 10/1993 | McDonald et al. | 426/95 |

FOREIGN PATENT DOCUMENTS

JP          09 299017          11/1997

* cited by examiner

Primary Examiner—George C. Yeung
(74) Attorney, Agent, or Firm—Winston & Strawn LLP

(57) ABSTRACT

The present invention relates to pizzas and pizza-type products preparation and delivery method. The present invention deals with a method for providing to consumer a freshly baked pizza-type food product using individually frozen ingredients, combining them and baking them in less than 5 minutes; the individually frozen ingredients and the pizza-type food product being respectively stored and baked in a mobile, compact and energetically autonomous baking-selling unit.

12 Claims, 1 Drawing Sheet

PIZZA PREPARATION AND DELIVERY METHOD AND UNIT

FIELD OF THE INVENTION

The present invention relates to pizzas and pizza-type products and to preparation and delivery methods for the same.

BACKGROUND OF THE INVENTION

Pizzas and similar dough products have immense popularity among consumers. Other pizza-type products include, bruscetta or focaccia. Generally consumers have to leave their homes or place of work and travel to a pizza restaurant if they want a high quality fresh baked pizza. Ordering a pizza for take-out or home delivery often results in disappointment for the pizza lovers due to delay and because the delivered pizza can be lukewarm and soggy. There are also other alternative methods that attempt to obtain a pizza or pizza-type product. One can purchase frozen pizza-type product, raw or pre-cooked, cook a fresh chilled pizza-type product or even prepare a pizza-type product at home from fresh or packaged ingredients.

The use of frozen pizza-type products does not lead to satisfactory results. In general, these type of products are pre-cooked and thus once reheated, they do not exhibit quality of a fresh baked product. On the other hand the baking or the heating of frozen pizza is generally a long step, typically 15 to 20 minutes. This fact is particularly limiting in the case of a pizza-type product that is to be delivered to consumer "on the move". In this kind of situation, the consumer does no want to wait more than a few minutes for such products.

Traditional "on the move" pizza-type products require baking-selling structures such as trucks or vans that use chilled ingredients to prepare the dough. In such a case, the problem arises of the preservation and storage of these fresh ingredients. Finally, at the end of the day, some non-used ingredients can be stored under a chilled condition, and some have to be discarded. In any case, this leads to an unequal and irregular quality for the product and to loss of money due to loss of raw material. Further, it implies complicated supply chain management since not all the different products exhibit the same shelf life. Other problems with the use of this kind of cooking-selling structure is the price, the bulkiness and the energy dependence of chilling and cooking devices that are located in such vehicle.

Thus, there is a need for pizza and/or pizza type products of high quality that can be prepared and delivered to consumers in a short time, such as a few minutes. Further, there is also a need for methods and means for delivering pizza-type products to consumer through a simple, cheap and non-bulky cooking-delivering vehicle. There is also a need for delivering constant quality products to consumers with a minimum of loss and a minimum of safety risks.

SUMMARY OF THE INVENTION

To this end, the present invention is directed to a method for providing to consumers a freshly baked pizza-type food product using individually frozen ingredients, and then combining and baking them in less than 5 minutes, preferably less than 4 minutes and more preferably less than 3 minutes. The individually frozen ingredients and the pizza-type food product are respectively stored and baked in a mobile, compact and energetically autonomous baking-selling unit, i.e., one having its own energy and power supply.

In the present context, a "pizza-type food product" should be understood to comprise a food product comprising a dough based product covered with a topping comprising vegetables, meat, cheese, spices, herbs and/or fat, for example. The dough based product used for the fabrication of a pizza-type product in the context of the present invention may be a pizza crust, bread crust, bread slice or pie crust.

The dough-based product used in the present invention as part of the individually frozen ingredients may be a frozen pre-baked or at least partially baked pizza crust, pie or bread slice. Furthermore, the dough-based product used in the present invention may be coated with a small amount of a foodstuff coating, such as tomato puree and/or cheese or a layer of fat. In this invention, however, it should be kept in mind that the frozen dough-based product does not contain all the topping ingredients of the final pizza-type product.

The individually frozen ingredients used for the preparation of the pizza comprise the frozen dough-based product and all the different frozen topping ingredients. Such topping ingredients may be cheese cubes or slices, grated cheese, pepperoni and tomato slices, tomato puree cubes, pepper and onion rings, sliced mushrooms, minced meat, ham cubes, and other kinds of vegetables or meat products that can be grated, minced, chopped or in the form of cubes. All the ingredients used are individually frozen and individually stored by category in boxes in a freezer device comprised in the mobile unit. Dough-based products are also stored as frozen in the freezer device of the unit used according to the invention. The frozen dough-based product used is preferably a pre-proofed and pre-cooked frozen dough-based product. All the individually frozen ingredients used for the fabrication of the pizza-type product according to the invention may have previously been prepared, sliced, grated or shaped, individually frozen and packaged in a factory, for example, prior to transit.

The combining step may be achieved by disposing the frozen topping ingredients on the frozen dough-based product. Once combined, one obtains a pizza-type product made from frozen ingredients that can be baked directly or can rest for a short time under chilled conditions. The use of individually frozen ingredients provides the unexpected advantage of customizing ad infinitum the pizza-type product on demand instead of having a frozen pizza-type product as a block of ingredients that are attached. Further, such product is close to traditional pizza or pizza-type product made from fresh ingredients for the consumer point of view but does not have the drawbacks previously exposed.

The main steps of the preferred method according to the invention include storing individually frozen pizza-type ingredients in a freezer disposed in a mobile, compact and energetically autonomous unit, disposing all the individually frozen topping ingredients on a frozen dough-based product, and baking the frozen pizza-type product thus formed in less than 5 minutes in an oven disposed in the mobile unit.

DETAILED DESCRIPTION OF THE PREFERRED EMBODIMENTS

Figure 1:
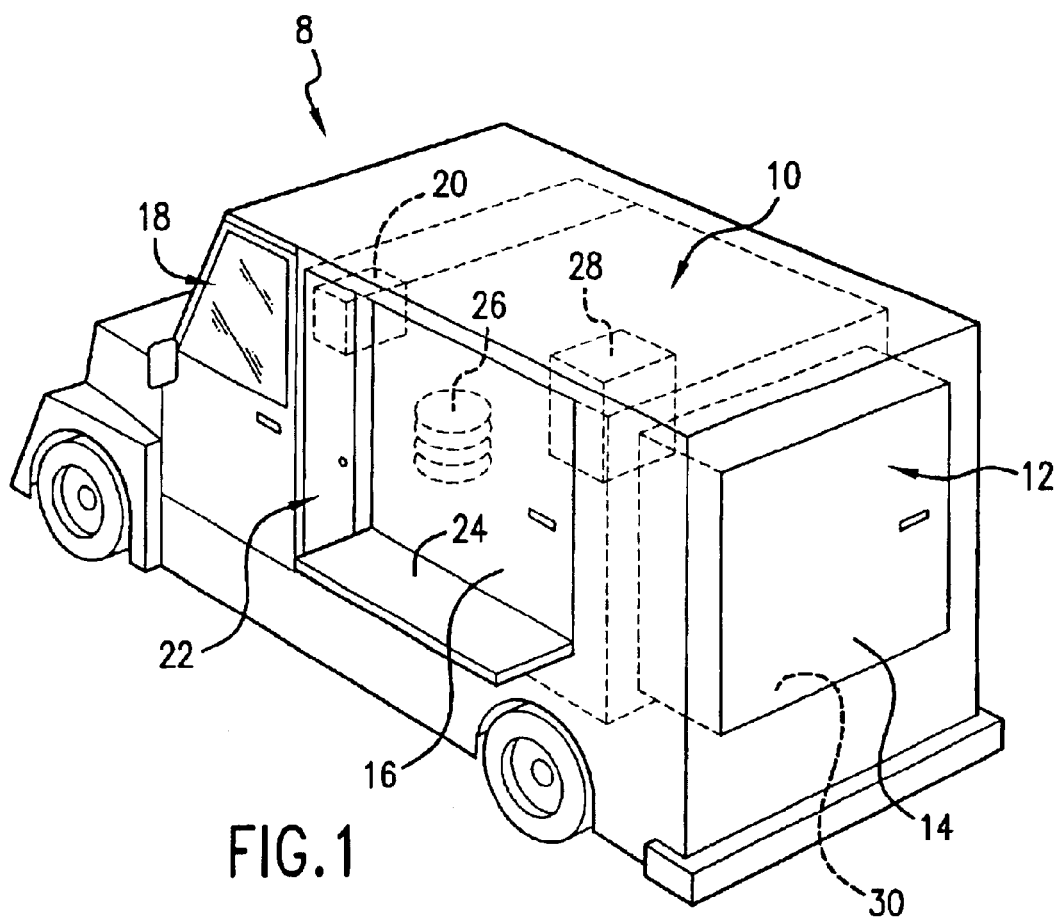
FIG. 1 is a schematic perspective view of an embodiment of a mobile cooking unit constructed according to the invention.

The mobile, compact and energetically autonomous baking-selling unit that can be used for delivering the pizza-type product according to the invention may be a vehicle such as a truck 8 or van. As "compact", the preferred vehicle should be understood as having a length of less than 4 meters, preferably less than 4 meters and high of less than 2.5 meters, preferably about 2 meters. The vehicle may be a self-powered vehicle having a diver's compartment 18 with a driver's seat and a cargo compartment 22 behind the driver's compartment, for example. The cargo's compartment preferably exhibits a volume of less than 4 $m^3$, preferably less than 3 $m^3$ and more preferably about 2.5 $m^3$. This cargo compartment may comprise a freezer 10 for storing frozen dough-based product 26 and individually frozen ingredients of the topping 28. Electrical energy supply 20 for the freezer compartment is achieved by batteries that are also stored in the cargo compartment of the vehicle. The cargo compartment also comprises a compact oven 12 for baking at least one pizza-type product at the same time.

The oven that may be used may be an electric oven with power supplied by batteries, but it is preferably a gas-heated oven comprising a base 30 made of refractory rocks equipped with gas burners. The oven may also comprise a dome which is also heated by lateral gas burners. The burners may be supplied with gas by gas bottles that are stored in the cargo compartment of the vehicle. The heating of the oven at a temperature of about 300 to 350° C., with a gradient from about 280 to 300° C. on the base to about 400 to 450° C. at the top of the dome, allows the baking of a frozen pizza made from combined individually frozen ingredients in about 3 to 4 minutes. Temperature may be regulated inside the oven using temperature probes that act as thermostat and regulator on gas burners. Surprisingly, in such conditions, after 3 or 4 minutes, a frozen pizza may be transformed in a well baked pizza exhibiting gold and crispy crust showing melted cheese, without any burning of the rim or unfrozen or cold topping.

The oven suitable for rapid baking of the pizza-type product according to the present method may be a compact oven that fits the dimension of the storage compartment of the vehicle. Preferably, the oven that may be used is a gas heated oven that is from about 35 to 50 cm high, from about 40 to 60 cm in depth, and from about 40 to 110 cm in width. The width of the oven preferably allows baking one, two or three 10 to 30 cm diameter pizza-type products in the same time. The oven may also be an electric oven supplied by batteries assuming that the temperature gradient developed allows the rapid baking of a pizza-type product according to the present invention.

The operator who is also the driver of the vehicle can fill the storage freezer at the beginning of the journey with all the individually frozen ingredients from a centralized production platform, such as a pizza-type product factory. The freezer used for storing all the frozen ingredients is designed and has dimensions fitted in order to be able to store enough frozen ingredients for preparing from about 75 to about 200 pizza-type products using the method according to the present invention. The operator should also be sure that the gas bottles for gas supply are sufficiently filled for at least one day heating and that the batteries are also sufficiently charged for at least one day electrical supply for the freezer and for an electrical oven if used.

The preferred vehicle is designed to have a back and a lateral opening 14,16 wide enough in order to permit the operator to access to the freezer and to the oven. Thus, once open, the lateral aperture allows the operator to prepare pizza-type products by combining the frozen dough-based products and individually frozen topping ingredients. Indeed, the frozen dough-based product may be disposed on a worktop just in front of the lateral aperture in order to permit the operator to have access to freezer and oven and at the same time be able to welcome the consumer and prepare easily the pizza-type products.

Once the vehicle has reached a delivering zone, the operator may install outside and close to the vehicle, a counter with shelves and a worktop 24 that may be stored in the cargo compartment 22 of the vehicle. This worktop may be parallel to the vehicle and disposed in front of the lateral aperture.

Once a consumer has ordered a pizza-type product, such as a pizza or a focaccia, the operator has at his disposal all the individually frozen ingredients disposed in racks in the freezer in order to customize the desired product. With the method according to the invention, the preparation is very quickly achieved by disposing all the necessary and pre-established frozen ingredients onto the surface of the frozen dough-based product that are stored behind the operator in the freezer fitted in the cargo compartment of the vehicle. Once the combination operation is realized, the pizza-type product may be disposed on the hot base surface of the heated oven. After about 2 to 4 minutes, a freshly baked, crispy, gold crust and cheese melted pizza or the like may be obtained and can thus be delivered to the consumer. Indeed, between the ordering by the consumer and the delivering, only about 3 to 5 minutes elapsed.

The method for preparing and delivering pizza-type product according to the present invention offers numerous advantages. The first is that this method may provide freshly baked pizza-type products with full organoleptic qualities of a restaurant-baked product, for example. Further, an other advantage of the present invention is the rapidity and the efficiency either in the preparation and/or baking and/or delivering of the pizza-type product.

Finally another advantage of the present invention is the cost of the production and exploitation. As explained above, the dimensions of the mobile baking-selling unit used according to the invention are reduced, thus the bulkiness of this vehicle is reduced and its price also. The price of the complete vehicle may be lower than 25,000 that is much lower than the normal price of other classical pizza trucks. Further, due to the conservation of all the individual ingredients of the pizza-type product as frozen, there is not wasting at the end of the journey if everything has not been used. The remaining items can be stored for the night in a bigger freezer at a central storage platform. The freezer of the vehicle may then be filled again the day after. Indeed, due to the use of individually frozen and calibrated ingredients, the overall quality and cost of the pizza-type products produced with the method according to the present invention is very high and very regular and constant.

Another essential point of the present invention is the safety of fabrication of the pizza-type product according to the present method. Since food items that are not used are maintained in frozen or refrigerated storage, there is less risk of contamination or spoilage. Also, a final advantage of the present invention is that the energetic autonomy of the mobile unit allowing the realization of the present method in any place also allows travelling of the unit at any place for any time due to the demands of the consumers.

What is claimed is:

1. A method for providing a freshly baked food product, comprising:

freezing a dough based crust;

freezing pizza toppings individually and separately from the crust;

assembling a frozen food product by applying the frozen toppings individually on the frozen crust; and baking the frozen food product to produce the baked food product, wherein the baking step takes less time than for a dough crust that is frozen together with the toppings.

2. The method of claim 1, further comprising storing the frozen crust and frozen toppings separately from each other in a mobile unit.

3. The method of claim 2, wherein the baking of the food product comprises baking the food product in the mobile unit.

4. The method of claim 1, wherein the food product is baked for less than about 5 minutes at a temperature sufficient for causing the crust to become substantially crispy and for substantially heating the toppings to produce a hot, cooked food product.

5. The method of claim 4, wherein the toppings comprise cheese, and the baking temperature is sufficient for melting the cheese.

6. The method of claim 4, wherein the baking temperature is between about 280° C. to about 450° C.

7. The method of claim 4, wherein the baking temperature comprises an average temperature of above about 300° C.

8. The method of claim 1, further comprising pre-baking at least one of the crust and toppings prior to the freezing thereof.

9. The method of claim 1, wherein the toppings comprise a plurality of different types of toppings, and each topping is frozen by separately freezing the different types of toppings.

10. The method of claim 1, wherein the toppings comprise cheese and tomato purée.

11. The method of claim 1, wherein the toppings are frozen by freezing and forming at least some of the toppings substantially as cubes.

12. The method of claim 1, further comprising slicing at least some of the toppings to produce sliced frozen toppings.

* * * * *

UNITED STATES PATENT AND TRADEMARK OFFICE
CERTIFICATE OF CORRECTION

PATENT NO.   : 6,858,243 B2  
DATED        : February 22, 2005  
INVENTOR(S)  : Blanchet et al.

It is certified that error appears in the above-identified patent and that said Letters Patent is hereby corrected as shown below:

Column 4,  
Line 65, after "freezing a", insert -- plurality of --; and after "dough based", delete "crust" and insert -- crusts, and storing the frozen crusts in a first location --.  
Line 67, delete "crust" and insert -- crusts, and storing the frozen toppings separately from the plurality of crusts in a second location --.

Column 5,  
Line 2, after "toppings individually on", insert -- at least one of --; and after "the frozen", delete "crust" and insert -- crusts --.  
Line 7, after "2. The method of claim 1," delete "further comprising storing" and insert -- wherein --.  
Line 8, after "frozen" delete "crust" and insert -- crusts --; and after "and frozen toppings", insert -- are stored --.

Column 6,  
After line 28, add the following claims:  
-- 13. The method of claim 9, wherein the different types of frozen toppings are stored separately from each other.  
   14. The method of claim 3, wherein the mobile unit is a vehicle.  
   15. The method of claim 14, wherein the vehicle is a motor vehicle. --.

Signed and Sealed this

Twenty-fourth Day of May, 2005

JON W. DUDAS  
*Director of the United States Patent and Trademark Office*